United States Patent [19]
Garris

[11] Patent Number: 4,875,623
[45] Date of Patent: Oct. 24, 1989

[54] VALVE CONTROL
[75] Inventor: Charles A. Garris, Vienna, Va.
[73] Assignee: Memrysafe, Inc., Norwalk, Conn.
[21] Appl. No.: 74,885
[22] Filed: Jul. 17, 1987
[51] Int. Cl.$^4$ ............................................ G05D 23/185
[52] U.S. Cl. .............................. 236/12.12; 236/78 D; 251/129.13; 364/502
[58] Field of Search .................. 236/12.12, 78 D, 78 C; 364/557, 502; 251/129.13; 318/594

[56] References Cited

U.S. PATENT DOCUMENTS 4,420,811 12/1983 Tarnay et al. .................. 137/561 R
4,696,428 9/1987 Shakalis ............................. 236/12.12

FOREIGN PATENT DOCUMENTS 2143343 2/1985 United Kingdom .............. 236/12.12

Primary Examiner—William E. Wayner
Attorney, Agent, or Firm—Connolly & Hutz

[57] ABSTRACT

A system having a microprocessor to provide an adjustable control of the temperature and pressure of water at the outlet of a single adjustable valve. The water temperature at the valve outlet is constantly monitored. A processor compares the actual water temperature with a specifically requested temperature for the water at the valve outlet, and provides signals to relays and a control circuit for a motor which adjusts the temperature of water by the relative proportions of hot and cold water discharged through the valving to the outlet. The system with the microprocessor provides a multi-speed control of the motor having variations in the speed of adjustment of the valve so as to effect a quick valve movement to a temperature in the vicinity of the desired temperature after which fine tuning provides the exactly requested temperature. The calculations of the microprocessor by including continuous monitoring of the valve positions and the water temperature coordinates the relative positioning of the valve in the mixing of the hot and cold water with the regulations of the water temperature by mixture in the valve so that the instructions from the microprocessor in response to the water temperature are aocemmodated to fully open and fully closed positions of the valve.

10 Claims, 4 Drawing Sheets

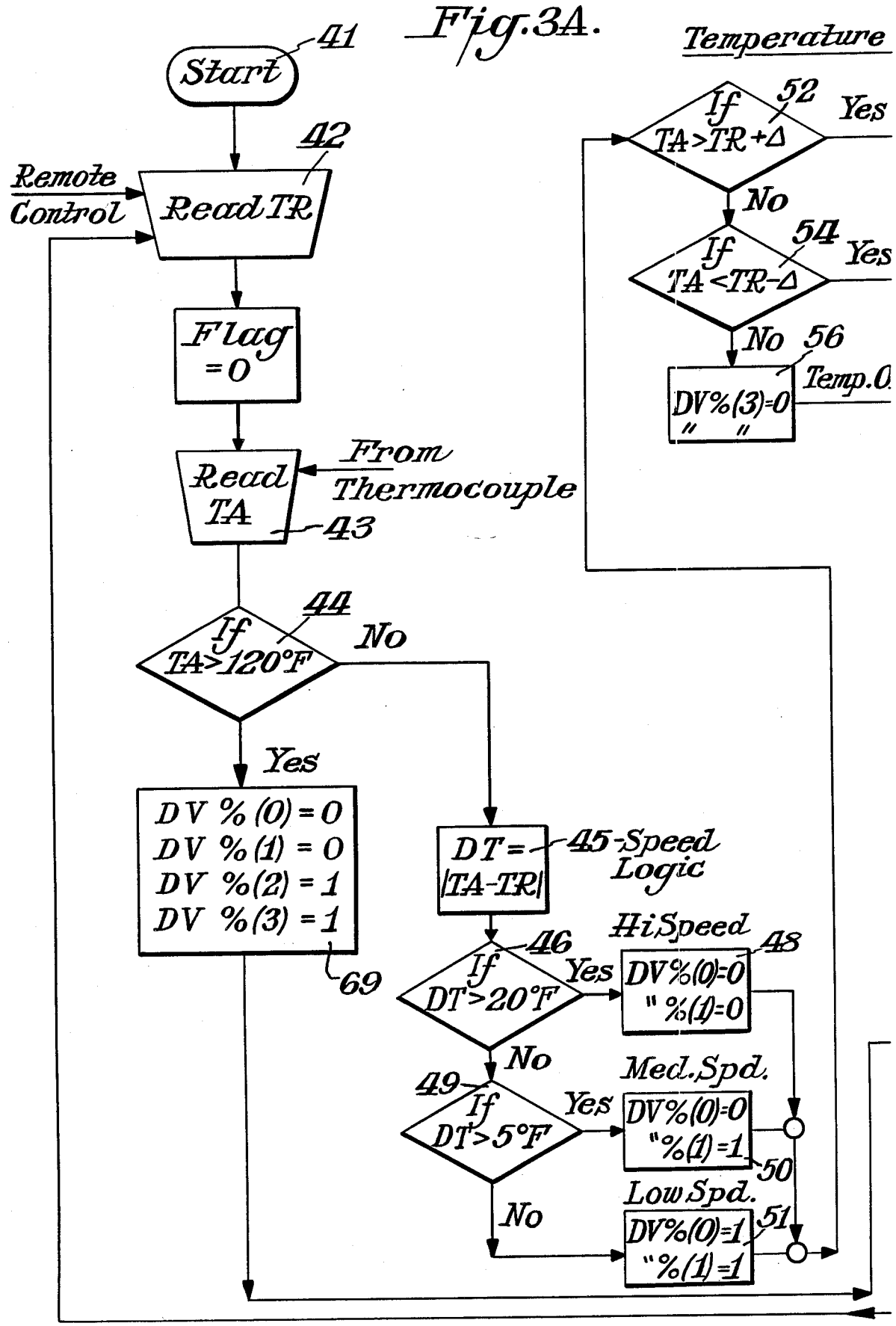

VALVE CONTROL

This invention relates to control of the temperature of water flowing through a flow system by a control valve in the system and more particularly to methods and devices for detecting control valve position and the temperature of water discharging from the control valve by comparing detected input data relative to valve positioning and changes in water temperature and pressure with specified input date.

Methods and apparatus for producing a water discharge having the desired temperature have already been described in which a control system constantly monitors the temperature of a discharge and compares said temperature with a desired temperature, and if the two are found to differ, generates a control signal to bring the temperature of the discharged output to a desired temperature.

However, the above method and apparatus have an essential drawback in a complex electro-mechanical control mechanism employed to control temperature in the flow and discharge. Various mechanical features are disclosed and complicate obtaining the stated purpose. Furthermore, these methods would generally be slow in order to avoid discharge temperature overshoot and oscillation.

One apparatus and method provides a control wherein the water discharge temperature oscillates in a time cycle around a predetermined mean value with adjustable amplitudes. This is imprecise.

SUMMARY OF THE INVENTION

It is an object of this invention to provide by a microprocessor an adjustable control of the temperature of water discharged from a mixing valve in which the rate of adjustment is variable and more particularly in which the relative positioning of the mixing valve is coordinated with regulation of the water temperature by mixture in the valve.

Another object of the present invention is the control of the temperature at the outlet of a control valve in a liquid flow system with a minimum of variation in the discharge temperature of the liquid discharging from the control valve.

Still another object of the this invention is provision in a microprocessor controlled flow system of means for determining by the microprocessor the relative positioning of a mixing valve and providing control instructions when the valve is fully open or fully closed. This voltage is converted into a binary number.

A further object is apparatus and method for rapidly changing outlet water temperature but arriving at a preselected water temperature gradually by reducing the rate of change.

Another object of the invention is a simple method and apparatus for water temperature control and avoiding complex mechanisms for driving a control valve.

In this invention, in a control system, a microprocessor controls hot/cold water mixing by a temperature regulating valve so that in demanding a water discharge temperature by means of an externally entered request the microprocessor provides a precise control of temperature regulation and receives binary signals generated by positioning of the regulating valve which are related to the temperature regulation in the operation of the valve.

The valve controls are designed to provide maximum water temperature in the event that hot water supply temperature is in excess of that temperature to provide a warning and a procedure programmed to shut down the discharge automatically in the event of dangerously high temperatures in the water.

In one embodiment, the control system senses water temperature by means of a thermocouple placed in the discharge outlet of the balanced pressure mixing valve. The water temperature is controlled by variation in the relative proportions of hot and cold water passed thru and mixed in the mixing valve. The variation is effected by means of a microprocessor instructed stepping motor operating the valve stem on the control valve (SBPV). This operation controls temperature and can shut off the flow. In this embodiment, the control of water temperature is performed with a three-speed control system to optimize the speed of convergence to a requested temperature.

The discharge of the valve is fitted with a thermocouple probe. Two limit switches are actuated by means relating to valve position, such as a cam placed on the control valve stem in such a way that a high TTL voltage is provided whenever the valve is either fully opened or fully closed. This voltage is converted into a binary number.

The central processing for the signals is provided by a computer with an interactive structures Model DAI 120 A/D convertor and a Model DDI 160 D/D converter. The DDI 160 can provide both digital input and digital output. The valve limit switches provide digital input, while the digital outputs control the stepping motors via a stepping motor controller providing clockwise/counterclockwise operation, speed control and disable. Two digital outputs control the stepping motor speed via a circuit incorporating two relays. This arrangement enables a choice of three stepping motor speeds. The speed selected depends upon the difference between the requested temperature and the actual temperature. If the temperature difference is large, a high speed is desirable in order to rapidly approach the requested temperature. However, if the temperature difference is small, a slower speed is necessary in order to avoid overshoot and oscillation of the temperature. For very precise temperature control, a very slow speed is useful.

In the operation of the limit switch logic, the programmed calculations provide instructions in accordance with the following. If the mixing valve 12 is fully closed and the temperature control instructions call for reduction of water temperature, the instruction is to disable the motor controller 16 and cease operation of the motor 15 leaving the system in a closed shutdown condition. This is represented by the decision diamond 62 of FIG. 3B.

If the valve 12 is fully opened and the temperature control instruction calls for increase in temperature, the programmed instruction is to disable the motor controller 16 and cease operation of the motor 15 leaving the system in a shutdown condition. This is represented in FIG. 3B by the decision diamond 64.

If the binary signals from the limit switches 26 and 27 indicate that the valve is in an intermediate position and if there is no shutdown command from the remote control 24, the programmed instructions from the temperature control calculations are carried out. This is represented by the decision diamond 57 of FIG. 3B.

In the operation of the shutdown command logic the calculations provided instructions in accordance with the following. A shutdown command from the remote control 24 with the valve 12 of FIG. 2 in other than a fully closed position carries the program to calculations providing instructions for the closing of valve 12 at medium speed. This is represented in FIG. 3 by the decision diamonds 66 and 68 and the operations block 67. Then when the valve 12 is fully closed the instruction is to disable the motor control of 16 of FIG. 2 and cease operation of the motor 15. This is represented in FIG. 3B by the decision diamond 60 and the block 61.

The computer is programmed in BASIC and various logic schemes can be prepared for the performance of the valve control. While the computer is in operation, temperatures may be requested, or the system may be turned on or shut down, by means of an external control box.

DETAILED DESCRIPTION OF THE DRAWINGS

FIGS. 3A and 3B are a program flow chart showing steps in the valve control according to the embodiment.

Figure 1:
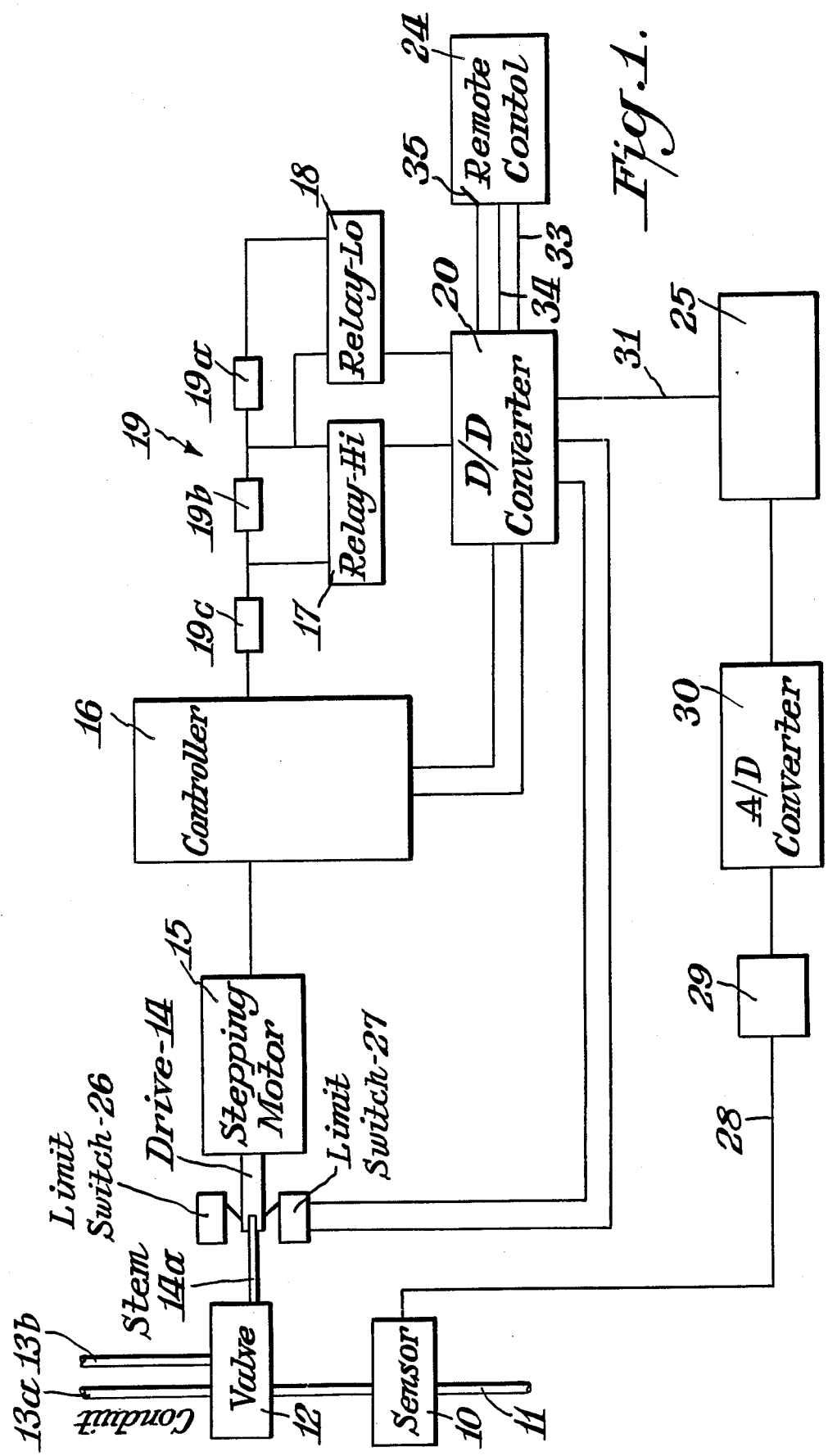
FIG. 1 is a block diagram of the valve control system of the present invention.

The system shown in FIG. 1 is provided with a sensor 10 in a flow stream 11 running through a standard balanced pressure mixing valve 12 (Speakman Balanced Pressure Valve) which receives a supply of liquid from a plurality of sources through suitable conduits 13a, (hot water) 13b, (cold water). A thermocouple, is a suitable sensor. The valve 12 is controlled thru drive 14 of stepping motor 15, (Hurst Model ABS Stepping Motor, ABS-3008-003). The drive 14 operates on the valve stem 14a of the valve 12. The stepping motor 15 is controlled by a stepping motor controller 16 (Hurst Model 220001 Stepping Motor Controller) which provides to the stepping motor 15 speed control, clockwise/counterclockwise rotation and disengagement.

In the balanced pressure apparatus of valve 12 the flows of hot and cold water are regulated independently to yield a substantially constant total flow rate. Effects of hot or cold water pressure transients are avoided by means of the pressure balancing module. A pressure sensing means is physically displaced by changes in pressure on either hot or cold side associated with an adjustable valve means with the relationship of that association being such that increases in the sensed pressure on one side result in a valve reaction causing decrease in pressure on the same side, tending to equalize the pressures under all conditions.

Control of the stepping motor 15 and the operation of the valve 12 is provided through the controller 16, a high speed relay 17, a low speed relay 18 (Potter & Brumfield R10 E1ZZ-S800 Relays) and a voltage divider 19 having resistor sections 19a (500 kilohms), 19b (100 kilohms) and 19c (56 kilohms).

Digital outputs from a D/D converter 20 (DDI-160, Digital ±10 Interface) on line 21 to the controller 16 and lines 22 and 23 to the high speed relay 17 and low speed relay 18, respectively, send digital commands to the controller 16 and thus determine the operation of the valve 12.

The D/D converter 20 is fed signals from a remote control 24 and a computer 25 and a pair of limit switches 26 and 27. The remote control 24 is comprised of a set of switches provided with suitable power such as 5 volts. The limit switches 26 and 27 located at the valve stem 14a and drive 14 are suitably actuated by the position of the valve 12. Switch 26 is closed when the valve is fully opened and switch 27 is closed when the valve is fully closed and binary signals are provided to the D/D coverter 20 indicative of these conditions.

A detector network consists of the sensor 10 feeding signals through a line 28 and a panel meter 29 to an A/D converter 30 and after analog-to-digital conversion in the converter 30 digital signals to the computer 25. The computer compares the detected actual temperature value and the requested temperature value and makes calculations and decisions with this information for commands to the D/D Converter 20 for translation to the converter 20 and the relays 17 and 18.

While the computer is in operation, temperatures may be requested, or the system may be turned on or shut down by signals from the remote control 24. A digital signal to raise the requested water temperature is provided to the D/D converter 20 via line 33, a digital signal to lower requested water temperature via line 34 and the shutdown from switch 35 on the control 20 via line 36.

Figure 2:
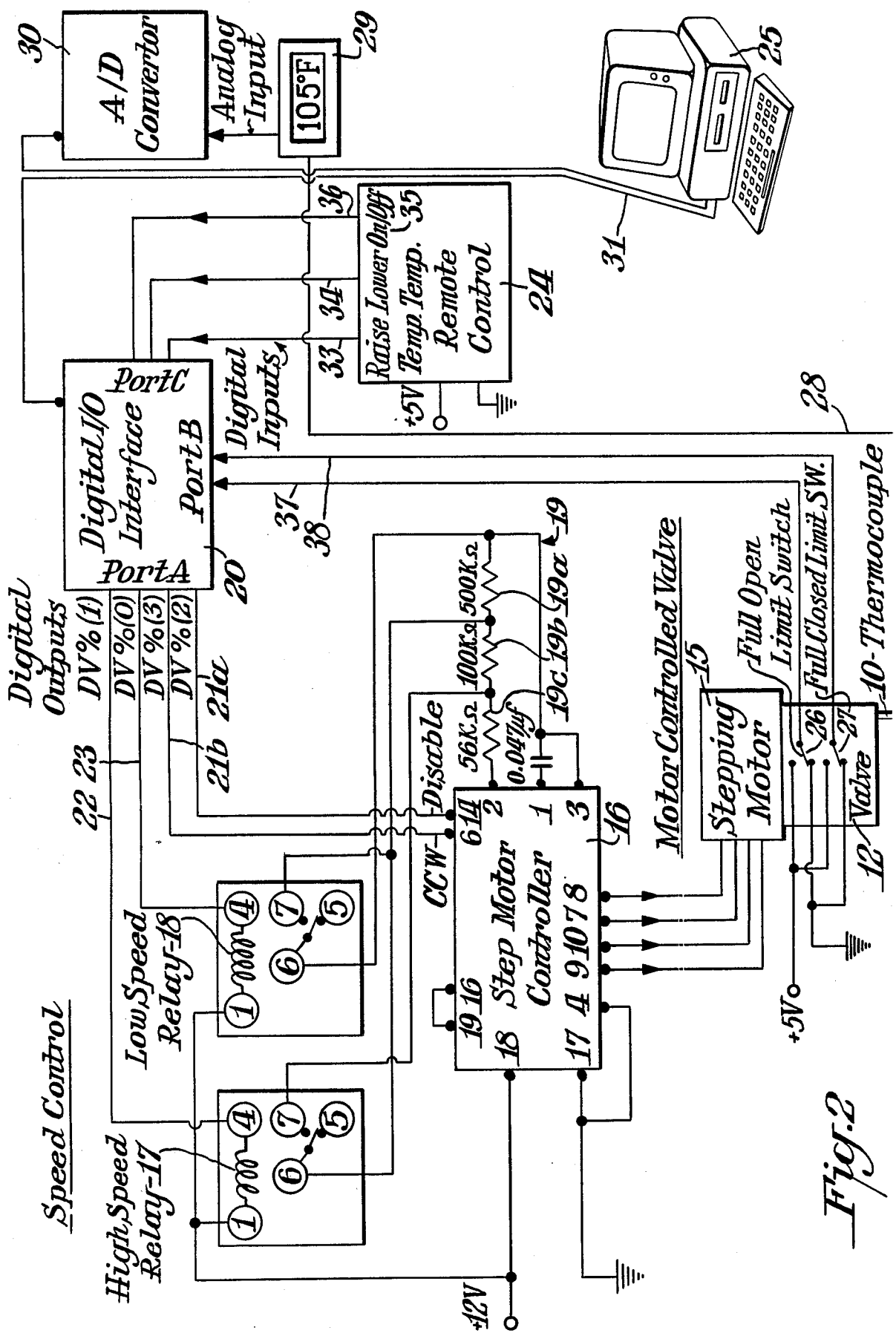
FIGS. 2 is a schematic diagram of the valve control system

FIGS. 2 is a schematic diagram of the embodiment of the detailed description. FIG. 2 shows the connection of lines 37 and 38 to port B of the converter 20 from the limit switches 26 and 27 respectively. The lines 33, 34 and 36 from remote control 24 are connected to converter 20 at port C, and the converter 20 at port A has lines 22 and 23 to the respective relays 77 and 18 and the connection to controller 16 is shown as line 21a to a disable pin 39 and a line 21b to the pin 40 for control of the drive 14. The controller 20 is connectible with the converter through these lines 21a and 21b and 22 and 23 with binary signals transmitted as ones and zeros. The following tables identifying the nomenclature and the binary numbers in the Binary codes for the states of and utilized in the operation of the program controlled calculations in the described embodiment, particularly as demonstrated in the logic flow chart of FIGS. 3A and 3B.

TABLE I

NOMENCLATURE FOR ULTRAVALVE LOGIC

TA = Actual Temperature
TR = Requested Temperature

TABLE II

| DIGITAL OUTPUTS (PORT A) | | | |
|---|---|---|---|
| | HI SPD | MED SPD | LOW SPD |
| DV % (0) RELAY #1 | 0 | 0 | 1 |
| DV % (1) RELAY #2 | 0 | 1 | 1 |
| DV % (2) | DISABLE STEPPING MOTOR (0 = DISABLE, 1 = ENABLE) | | |
| DV % (3) | ROTATION DIRECTION (0 = CW, 1 = CCW) | | |

TABLE III

| LIMIT SWITCH LOGIC (PORT B) | |
|---|---|
| A = ARRAY % | |
| Decimal Binary | CONDITION |
| 0 (000) | Valve in intermediate position |
| 1 (001) | Valve fully closed |
| 2 (010) | Valve fully opened |
| 4 (100) | Shutdown command, valve intermediate position |
| 5 (101) | Shutdown command, valve fully closed |

TABLE III-continued

LIMIT SWITCH LOGIC (PORT B)

| A = ARRAY % Decimal Binary | CONDITION |
|---|---|
| 6 (110) | Shutdown command, valve fully opened |

Figure 3B:
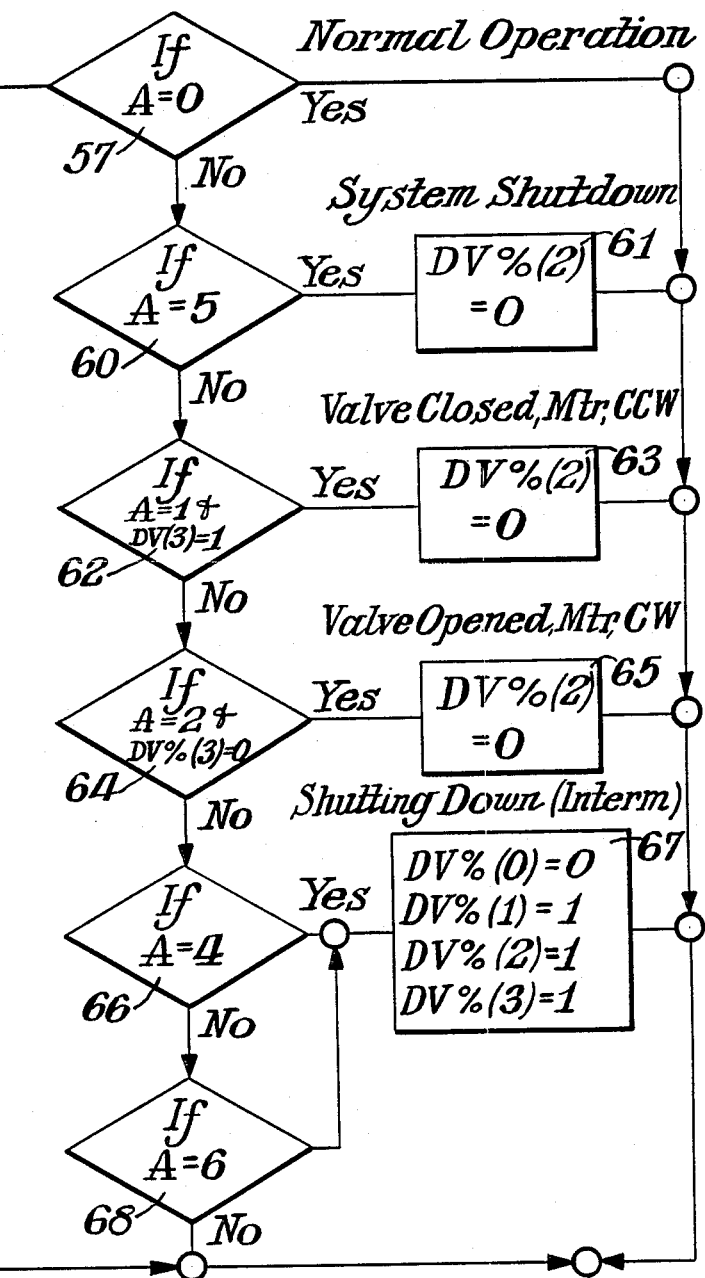

The logic flow chart of FIGS. 3A and 3B is illustrative of program operation of the program stored in the computer 25 for control of water outlet temperature.

In FIGS. 3A and 3B the program is initiated by application of power as represented at oval 41 of FIG. 3A. Then the requested temperature is read in from the remote control as represented at trapezoid 42. The next step is the reading in from the sensor 10 and converter 30 of the actual temperature TA at READ TA represented at trapezoid 43.

The first calculation is whether the actual temperature exceeds the normal range, for example 120° F. This decision point is represented by diamond 44. If the actual temperature is greater than 120° F. at decision point 44, the computer sends out an emergency shutdown signal as discussed in greater detail below.

The negative branch of diamond 44 takes the program to the calculation of the absolute value of the difference between the actual temperature and the requested temperature by subtraction of the requested temperature in block 45. After the calculation is done the output is advanced and represented by a decision diamond 46 and a judgment is made whether the difference is greater than 20° F. The affirmative branch of diamond 46 carries the program to providing a high speed control represented by block 48.

In the system illustrated in FIG. 2 in the operation represented at block 48 of FIG. 3A, a signal is generated for transmission of the high speed instruction to the relays 17 and 18. The digital output from Port A of converter 20 is zeros on both lines 22 and 23. Thus, in the function the computer 25 calculations provide that the valve 12 be operated at a high speed in response to the sensing of the actual temperature.

In FIG. 3A the negative branch from decision diamond 46 carries the program to a judgment whether the difference is greater than 5° F. as represented by decision diamond 49. The affirmative branch of diamond 49 carries the program to providing a medium speed control as represented by block 50. Referring to FIG. 2 in the operation represented at block 50 of FIG. 3A a signal is generated for transmission of a medium speed instruction to the relays 17 and 18. The digital output from Port A of converter 20 is a zero on line 23 and a one on line 22. Thus in this function, the computer 25 calculations provide that the valve 12 be operated at a medium speed in response to the sensing of the actual temperature.

In FIG. 3A the negative branch from decision diamond 49 carries the program to an operation for generating a signal for transmission of the low speed instruction to the relays 17 and 18 of FIG. 2. The digital output from Port A is ones on both lines 22 and 23. Thus, in this function, the computer 25 calculations provide that the valve 12 be operated at a low speed in response to the sensing of the actual temperature. In FIG. 3, the judgment at the decision points 44, 46 and 49 performed in the computer 25 carry out the logic process of motor speed selection.

The performance of the logic process of temperature control by the program involves first a decision whether the actual temperature is greater than the requested temperature within a predetermined margin of error. This decision is represented by decision diamond 52. The affirmative branch from the decision diamond 52 carries the program to providing an instruction to the controller 16 of FIG. 2 to operate the motor 15 to reduce the outlet water temperature. Referring to FIG. 3AB, in the operation represented at block 53 a signal is generated for transmission of an instruction to the controller 16 of FIG. 2. The digital output from Port A of converter 20 is a one on line 21a and a one on line 21b. Thus in this calculation, the computer 25 calculations provide enabling the motor 15 and a counter-clockwise rotation of valve stem 14 which reduces the water temperature by reducing the flow of hot water and increasing the flow of cold water, through the valve 12.

The negative branch from the decision diamond 52 carries the program to a judgment whether the actual temperature is less than the requested temperature within a predetermined margin of error. This decision is represented by decision diamond 54. The affirmative branch from the decision diamond 54 carries the program to providing an instruction 54 to the controller 16 of FIG. 2 to operate the motor 15 to increase the water temperature. In the operation represented by block 55 of FIG. 3B, a signal is generated for transmission of an instruction to the controller 16 of FIG. 2. The digital output from port A of converter 20 is a one on line 21a and a zero on line 21b. Thus, in this calculation, the computer 25 calculations provide enabling the motor 15 and a clockwise rotation of valve stem 14 which increases the water temperature by increasing the flow of hot water and decreasing the flow of cold water, through the valve 12.

Referring to FIG. 3A, the negative branch from the decision diamond 54 carries the program to disabling the controller 16 of FIG. 2 because no instruction to the motor 15 is called for. In the operation represented by block 56 of FIG. 3A a signal is generated for transmitting an instruction to the controller 16 of FIG. 2. The digital output from port A is a zero on line 21a. Thus, in this calculation, the computer 25 calculations disable the motor 15 and no change in the valve takes place.

After the calculation of the temperatures conditions and the instructions for the temperature control of the water output, a judgment is made of the position of the mixing valve relative to its fully open or fully closed positions and whether a shutdown command has been provided to the D/D converter 20 from the remote control 24. The limit switch logic is charted in the Table III.

The operation of the limit switch and shutdown logic as effected by binary signals is represented at the right side of the flow chart of FIGS. 3A and 3B. In the operation represented at the decision diamond 52 if the valve 12 is in an intermediate position between its relative fully open and fully closed positions and there is no shutdown command from remote control 24 the affirmative branch of diamond 57 carries the program to the instructions for transmitting the output from the D/D converter 20 as determined by the previous calculations. The operations pursuant to the instructions resulting from the previous calculations are represented in FIG. 3B by the trapezoid 58.

The negative branch of decision diamond 57 carries the program to the conditions of valve fully open or closed and shutdown commands. The program involves a series of determinations as to shutdown commands and valve positions with the resultant decisions either terminating water flow or reducing the hot water flow, as follows.

The decision diamond 60 represents the determination whether there is a shutdown command with the valve 12 fully closed. The affirmative branch of the decision diamond 60 carries the program to an instruction to disable the controller 16 represented by block 61 with a cessation of the operation of motor 15 by instructions issued from computer 25 through the system illustrated in FIGS. 1 and 2. The negative branch carries the program to the determination whether valve 12 of FIG. 2 is fully closed and the motor 15 under instruction for further closing in a counterclockwise operation as represented in a decision diamond 62 of FIG. 3B. The affirmative branch of decision diamond 62 carries the program to the calculations represented by block 63 which provide a binary zero instruction to controller 16 on line 21a of FIG. 2.

Referring to FIG. 3B, the negative branch of decision diamond 62 carries the program to the determination whether the valve 12 is fully open and the motor 15 under instruction for a clockwise operation tending toward further opening as represented in a decision diamond 64. The affirmative branch of decision diamond 64 carries the program to the calculations represented by block 65 which provide a binary zero instruction to controller 16 on line 21a of FIG. 2. This disables the controller with the cessation of motor 15 operation.

The negative branch of decision diamond 64 carries the program to a determination whether the system has received a shutdown command with the valve 12 either in intermediate position decision diamond 66, or fully open decision diamond 68. An affirmative from either of these determinations carries the program to calculations represented by block 67 resulting in instructions to close valve 12 at medium speed. It will be readily understood that when this closing operation reaches the condition in the system illustrated in FIGS. 1 and 2 of the shutdown command with the valve 12 fully closed processing unit of computer 25 generates the signals of the logic of the above description of decision diamond 60 and block 61 of FIG. 3B.

The output signals generated by the logic represented at decision diamond 57 and blocks 61, 63, 65 and 67 are represented by trapezoids 58 and 59 as applied to the relays 17 and 18 and controller 16 of FIGS. 1 and 2.

Also the application of the output signals generated by the logic represented at block 69 is represented at trapezoids 58 and 59. Block 69 represents the program operation generated when in an affirmative determination at decision diamond 44 reports an actual temperature outside the normal range, i.e. over 120° F. The signals generated for transmission in the instruction from the computer 25 calculations are zeros on lines 22, 23 and ones on lines 21a and 21b. Thus under the instructions resulting from the signals generated on the affirmative branch from decision diamond 44 the controller 16 is enabled to effect counterclockwise or closing motion to the valve 12 at the highest speed.

I claim:

1. In a system for providing and maintaining a predetermined temperature in a flowing liquid carried in a flow system of liquids of different temperatures, the combination comprising a supply means comprised of at least two liquids of different temperatures a mixing control valve capable of adjusting the mixing of at least two supplies of liquid at different temperatures in variable proportions means adjacent the mixing control valve for observing the temperature of a liquid flowing out of the flow system and providing data in digital signals correlated to said observed temperature, means responsive to observation of a temperature value of a liquid drawn through the flow system to generate signals, summarized in digital form, for evaluation of the temperature of the liquid drawn through the flow system means for introducing into the system a signal in binary form indicative of a preselected temperature value of the liquid at the outlet of the flow system, means for comparing the binary data generated by the observed temperature value and the binary data generated by the preselected temperature value for providing signals, means for selecting the rate of change of the relative proportions of said two liquids comprising means responsive (i) to a first predetermined difference between the said observed temperature and said predetermined temperature for transmitting a first set of signals to means for operating the mixing control valve to change the relative proportions of the two liquids at a relatively rapid rate (ii) to a second predetermined difference between the said observed temperature and said predetermined temperature for transmitting a second set of signals to said means for operating the mixing control valve to change the relative proportions of the two liquids at a less rapid rate and (iii) to a third predetermined difference between said observed temperature and said predetermined temperature for transmitting a third set of signals to said means for operating the mixing control valve to change the relative proportions of the two liquids at a less rapid rate, whereby the predetermined temperature is provided gradually by reducing the rate of change of the relative proportions of the two liquids.

2. The system as claimed in claim 1 wherein said valve includes means for generating a position signal indicative of a fully open valve, said means for operating the mixing control valve includes a motor operating the valve to increase the flow of the higher temperature liquid by opening the valve, said means for comparing the binary data and providing signals provides signals to operate the motor to increase the flow of liquid of higher temperature and to disable the motor when said position signal is indicative of a fully open valve and the signals operate the motor to increase the flow of liquid of higher temperature.

3. The system as claimed in claim 1 wherein said valve includes means for generating a position signal indicative of a fully closed valve, said means for operating the mixing control valve includes a motor operating the valve to decrease the flow of the higher temperature liquid by closing the valve, said means for comparing the binary data and providing signals provides signals to operate the motor to decrease the flow of liquid of higher temperature and to disable the motor when said position signal is indicative of a fully closed valve and the signals operate the motor to decrease the flow of liquid of higher temperature.

4. A system as claimed in claim 1 wherein said means for selecting the rate of change of the relative proportions of said two liquids includes a pair of relays and first, second and third resistances and, said first resistance having a lesser resistance than said second and third resistances.

said means for comparing binary data and providing signals provides a digital output to the relays so as to apply a voltage across the first resistance and provide change of the relative proportions of the two liquids at said relatively rapid rate.

5. A system as claimed in claim 1 wherein said means for selecting the rate of change of the relative proportions of said two liquids includes relays and first, second and third resistances, said first and second resistances having lesser resistance than said third resistance, said means for comparing binary data and providing signals provides a digital output to the relays so as to apply a voltage across the first and second resistances and provide change of the relative proportions of the two liquids at said less rapid rate.

6. A system as claimed in claim 1 wherein said means for selecting the rate of change of the relative proportions of said two liquids includes relays and first, second and third resistances, said means for comparing binary data and providing signals provides a digital output to the relays so as to apply a voltage across the first, second and third resistances and provide change of the relative proportions of the two liquids at said least rapid rate.

7. A method for controlling the temperature of liquid flowing from a valve for mixing two supplies of liquid of different temperatures to provide a requested temperature in a liquid flowing from said valve and to start and stop the flow of liquid said mixing valve having a main shaft which is rotatable in a clockwise motion and a counterclockwise motion when the valve is adjusted and has a means for providing and controlling said rotation comprising the steps of:

mixing at least two supplies of liquid of different temperatures in variable proportions, generating a digital signal indicative of a position of the main shaft of said mixing valve as of selected instant in time during which said mixing valve is operative in issuing a flow of output liquid and the relative proportions of said two supplies in said mixing step; then performing calculations in a microprocessor to provide commands for controlling the main shaft to adjust the valve position, comprising observing the temperature of the liquid flowing out of the system and providing data in digital signals correlated to said observed temperature, introducing digital signals indicative of a requested temperature value of the liquid flowing from said valve comparing the digital signals provided by the observed temperature and the digital signals introduced by said requested temperature and providing a signal correlated to the difference between said observed temperature and said requested temperature for changing the relative proportion of said two supplies of liquid in said mixing step, reproducing by gradations the rate of change of said relative proportions by calculating the temperature difference to provide digital signals controlling rotation of said mixing valve shaft, to produce a relatively rapid rate of change with a first predetermined temperature difference a less rapid rate of change with a second predetermined temperature difference a less rapid rate of change with a third predetermined temperature difference.

8. In a method as claimed in claim 7 in the step of opening the valve to increase the proportion of the higher temperature supply, determining the temperature at the out flow, calculating the temperature difference to provide a temperature signal to increase the proportion of the higher temperature supply of liquid generating a digital signal indicative of a fully open valve and disabling the valve motion when said valve signal indicates a fully open valve and said temperature signal operates to increase the proportion of the higher temperature supply.

9. In a method as claimed in claim 7 in the step of closing the valve to decrease the proportion of the higher temperature supply determining the temperature at the out flow, calculating the temperature difference to provide a temperature signal to decrease the proportion of the higher temperature supply, generating a digital signal indicative of a fully closed valve, and disabling the valve motion when said valve signal indicates a fully closed valve and said temperature signal operates to decrease the proportion of the higher temperature supply.

10. In a system for providing and maintaining a predetermined temperature in a flowing liquid carried in a flow system of liquids of different temperatures and controlling the temperature of liquid flowing from a valve for mixing two supplies of liquid of different temperatures to provide a requested temperature in a liquid flowing from said valve and to start and stop the flow of liquid, the combination comprising a supply means comprised of at least two liquids of different temperatures, a mixing control valve capable of adjusting the mixing of at least two supplies of liquid at different temperatures in variable portions and having a main shaft which is rotatable in a clockwise motion and a counterclockwise motion when the valve is adjusted, means adjacent to said valve for observing the temperature of a liquid drawn through the flow system and flowing through said valve to generate signals, summarized in digital form, for evaluation of the temperature of the liquid drawn through the valve, means for introducing into the system a signal in binary form indicative of a preselected temperature value of the liquid at the outlet of the flow system, means for generating a digital signal indicative of a position of the main shaft of said mixing valve as of a selected instant in time during which said mixing valve is operative in issuing a flow of output liquid and of the relative proportions of said two supplies in said mixing step, means for performing calculations in a microprocessor comparing the digital signals, and means for providing a signal correlated to the shaft position and the difference between said observed temperature and said requested temperature for changing the relative proportion of said two supplies of liquid in said mixing step, said signal providing means including, means for reducing by gradations the rate of change of said relative proportions by calculating the temperature difference and providing digital signals means for providing commands controlling rotation of said mixing valve shaft with said digital signals, wherein means for selecting the rate of change of the relative proportions of said two liquids include means responsive (i) to a first predetermined difference between the said observed temperature and said predetermined temperature for transmitting a first set of signals to means for rotating the mixing control valve shaft to change the relative proportions of the two liquids at a relatively rapid rate and means responsive (ii) to a second predetermined difference between the said observed temperature and said predetermined temperature for transmitting a second set of signals to said means for rotating the mixing control valve shaft to change the relative proportions of the two liquids at a less rapid rate.

* * * * *

UNITED STATES PATENT AND TRADEMARK OFFICE
CERTIFICATE OF CORRECTION

PATENT NO. : 4,875,623

DATED : October 24, 1989

INVENTOR(S) : CHARLES A. GARRIS

It is certified that error appears in the above-identified patent and that said Letters Patent is hereby corrected as shown below:

In Claim 7,

Column 10, line 3, "reproducing" should read -- reducing -- .

Signed and Sealed this

Third Day of March, 1992

*Attest:*

HARRY F. MANBECK, JR.

*Attesting Officer*      *Commissioner of Patents and Trademarks*